(12) United States Patent
Huang et al.

(10) Patent No.: US 8,913,360 B2
(45) Date of Patent: Dec. 16, 2014

(54) CONTROLLERS, POWER SUPPLIES AND CONTROL METHODS

(75) Inventors: Kuo-Chien Huang, Hsin-Chu (TW); Ren-Yi Chen, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 297 days.

(21) Appl. No.: 13/297,268

(22) Filed: Nov. 16, 2011

(65) Prior Publication Data

US 2012/0120533 A1  May 17, 2012

(30) Foreign Application Priority Data

Nov. 17, 2010  (CN) .......................... 2010 1 0554671

(51) Int. Cl.
*H02H 3/20* (2006.01)
*H02M 3/335* (2006.01)
*H02M 1/00* (2006.01)

(52) U.S. Cl.
CPC .. *H02M 3/33507* (2013.01); *H02M 2001/0009* (2013.01)
USPC ......................................... 361/91.1; 361/111

(58) Field of Classification Search
CPC ............................................... H03M 3/335072
USPC .................................................. 361/91.1, 111
See application file for complete search history.

(56) References Cited

U.S. PATENT DOCUMENTS

| 7,133,300 B1* | 11/2006 | Yang .......................... 363/56.11 |
| 7,208,884 B2* | 4/2007 | Bao et al. ....................... 315/244 |
| 7,907,425 B2 | 3/2011 | Lin |
| 8,427,802 B2* | 4/2013 | Yoshizawa ................... 361/91.1 |
| 2005/0162872 A1* | 7/2005 | Hirabayashi et al. ........... 363/19 |

FOREIGN PATENT DOCUMENTS

| CN | 100409136 C | 8/2008 |
| TW | 516261 | 1/2003 |
| TW | 200824240 | 6/2008 |
| TW | 200919923 | 5/2009 |
| TW | 201009532 | 3/2010 |

* cited by examiner

*Primary Examiner* — Rexford Barnie
*Assistant Examiner* — Tien Mai
(74) *Attorney, Agent, or Firm* — Winston Hsu; Scott Margo

(57) ABSTRACT

Power supplies together with related over voltage protection methods and apparatuses. A power supply has a transformer including a primary winding and an auxiliary winding. A power switch is coupled to the primary winding and a sensing resistor coupled between the power switch and a grounding line. A multi-function terminal of a controller is coupled to the sensing resistor. A diode and a first resistor is coupled between the auxiliary winding and the multi-function terminal.

2 Claims, 7 Drawing Sheets

CONTROLLERS, POWER SUPPLIES AND CONTROL METHODS

BACKGROUND OF THE INVENTION

1. Field of the Invention

The present invention relates to a protection circuit of a power supply.

2. Description of the Prior Art

Switching mode power supplies (SMPS), which control on and off states of a power switch to store and release energy in an inducting unit to provide required power to a load, make up the majority of power supplies due to conversion efficiency and product size thereof.

For example, FIG. 1 is a diagram showing a SMPS 10 with a flyback structure. A bridge rectifier 12 rectifies AC power to provide DC power $V_{IN}$, which may be as high as 100 Volts to 300 Volts, at an IN end. A controller 18 detects a detection signal $V_{CS}$ across a current sensing resistor 16 via a CS end. The detection signal $V_{CS}$ is a voltage signal corresponding to an induction current through a primary winding 24 of a transformer 20 when a power switch 15 is turned on. The controller 18 increases or decreases the induction current by controlling on and off states of the power switch 15 via a GATE end. A secondary winding 22 provides output power $V_{OUT}$ to a load 30. An auxiliary winding 23 provides operating power $V_{CC}$ to the controller 18.

Most switching mode power supplies need a protection mechanism to prevent abnormal conditions. A common protection mechanism is called over voltage protection, which turns off the power switch for a period of time when the output voltage $V_{OUT}$ is too high.

FIG. 2 is a diagram showing an over voltage protection mechanism. In FIG. 2, an over voltage protection circuit is arranged in the controller 18. If a comparator 32 determines a voltage of the operating power $V_{CC}$ exceeds a reference voltage $V_{REF1}$, the over voltage protection is triggered. However, the voltage of the operating power $V_{CC}$ may not correctly correspond to the output power voltage $V_{OUT}$ due to inductor leakage. Therefore, the protection mechanism of FIG. 2 is not proper.

FIG. 3 is a diagram showing another over voltage protection mechanism. When the output power voltage $V_{CC}$ exceeds a predetermined voltage of a Zener diode 38, a photo-coupler 36 pulls down a voltage at an input end of a comparator 34 to trigger an over voltage signal $S_{OVP}$. However, the protection mechanism of FIG. 3 needs the additional Zener diode 38 and photo-coupler 36, which increases cost and product size.

SUMMARY OF THE INVENTION

The present invention provides a controller for controlling a power switch of a power supply. The power supply provides an output voltage. The controller comprises a multi-function terminal, a delay time generator, an over voltage detection circuit, and a gate controller. The delay time generator is for providing a delay time after the power switch is turned off. The over voltage detection circuit is for comparing a voltage of the multi-function terminal with a reference voltage after the delay time in order to trigger an over voltage signal. The over voltage signal indicates the output voltage is over a predetermined value. The gate controller is for turning off the power switch according to the voltage of the multi-function terminal when the power switch is turned on. The voltage of the multi-function terminal corresponds to a current through the power switch when the power switch is turned on.

The present invention further provides a power supply. The power supply comprises a transformer comprising a primary winding and an auxiliary winding. A power switch is coupled to the primary winding. A sensing resistor is coupled between the power switch and a grounding line. A controller comprises a multi-function terminal coupled to the sensing resistor. A diode and a first resistor are serially coupled between the auxiliary winding and the multi-function terminal.

The present invention further provides a control method for a power supply providing an output voltage. The power supply comprises a power switch. The power supply disables a gate signal to turn off the power switch according to a voltage of a multi-function terminal when the power switch is turned on. The voltage of the multi-function terminal corresponds to a current through an inducting unit. The power supply detects the voltage of the multi-function terminal after the power switch is turned off for a period of delay time. When the voltage of the multi-function terminal is over a predetermined value, the power supply triggers an over voltage signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
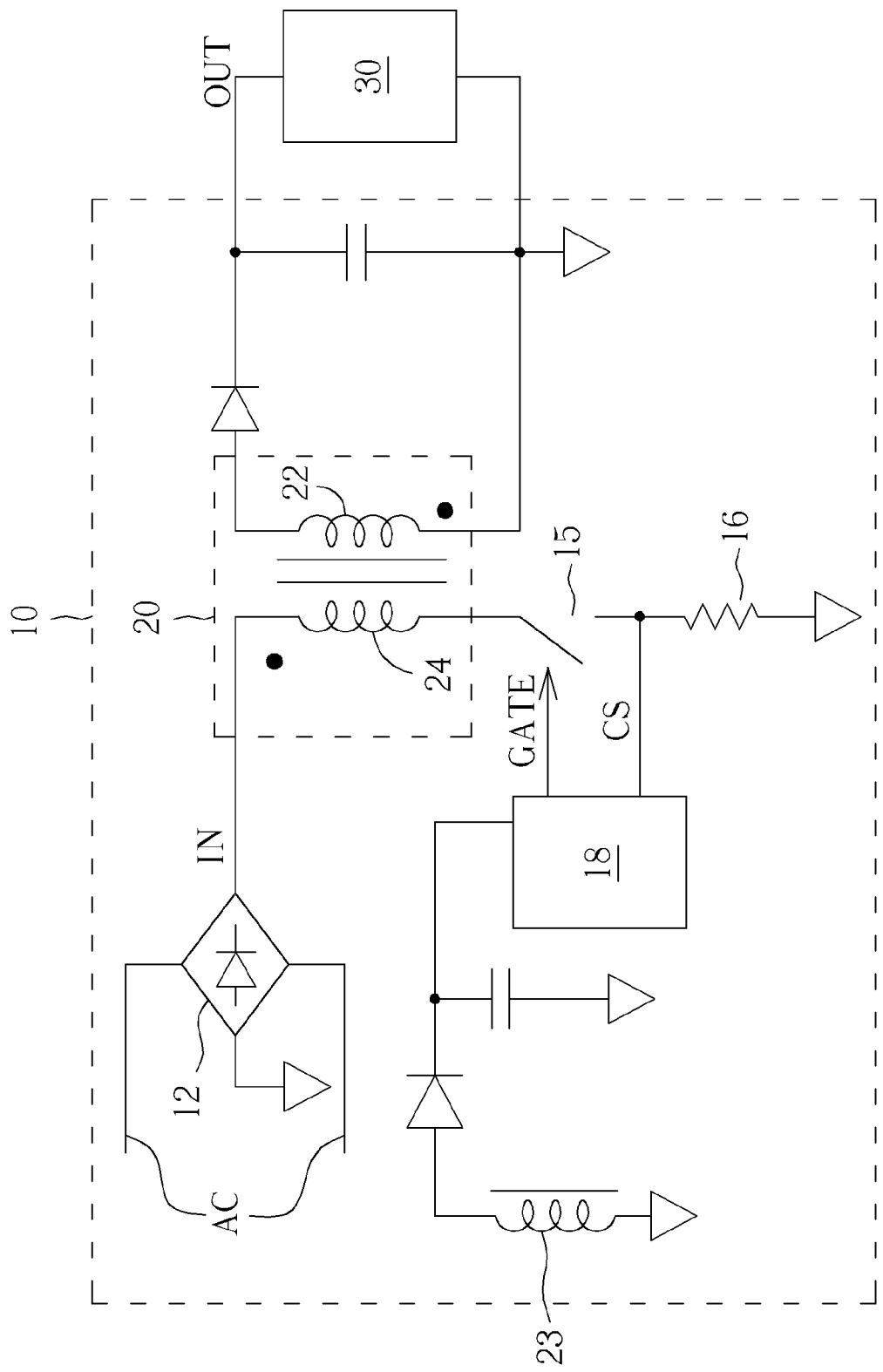
FIG. 1 is a diagram showing a switching mode power supply (SMPS) of the prior art.
Figure 2:
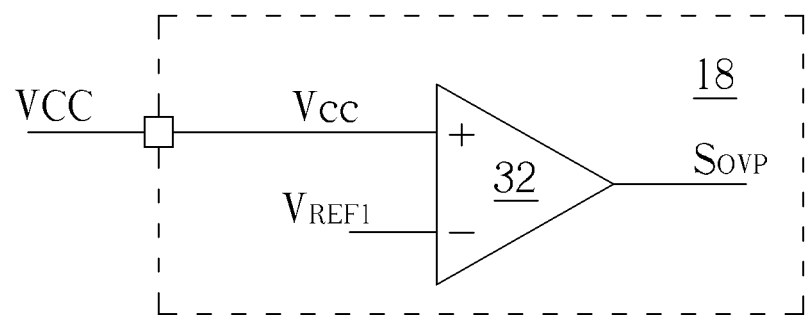
FIG. 2 and FIG. 3 are diagrams showing over voltage protection mechanisms.
Figure 3:
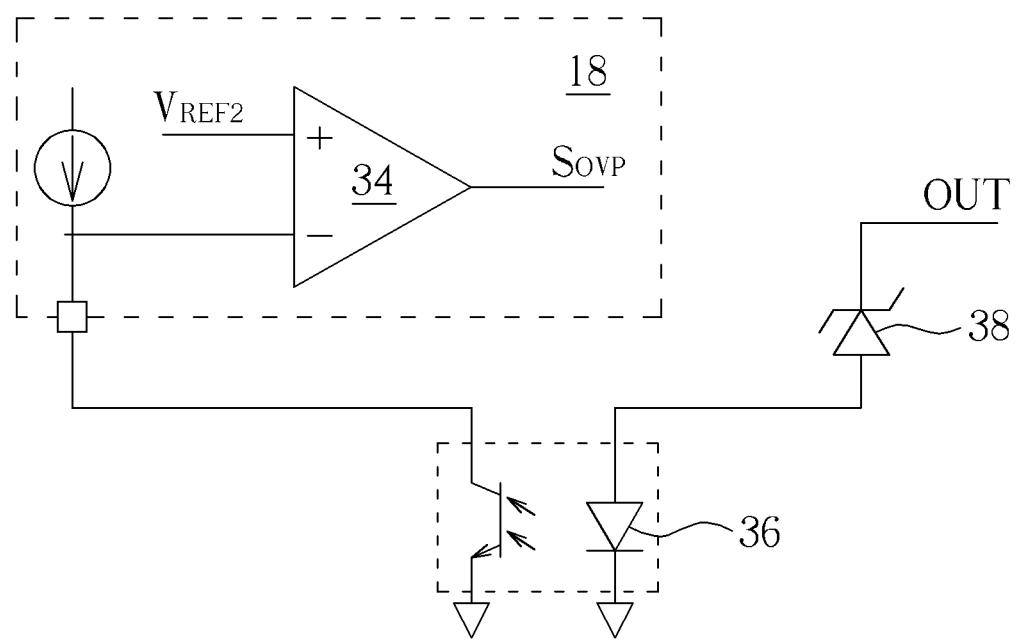
Figure 4:
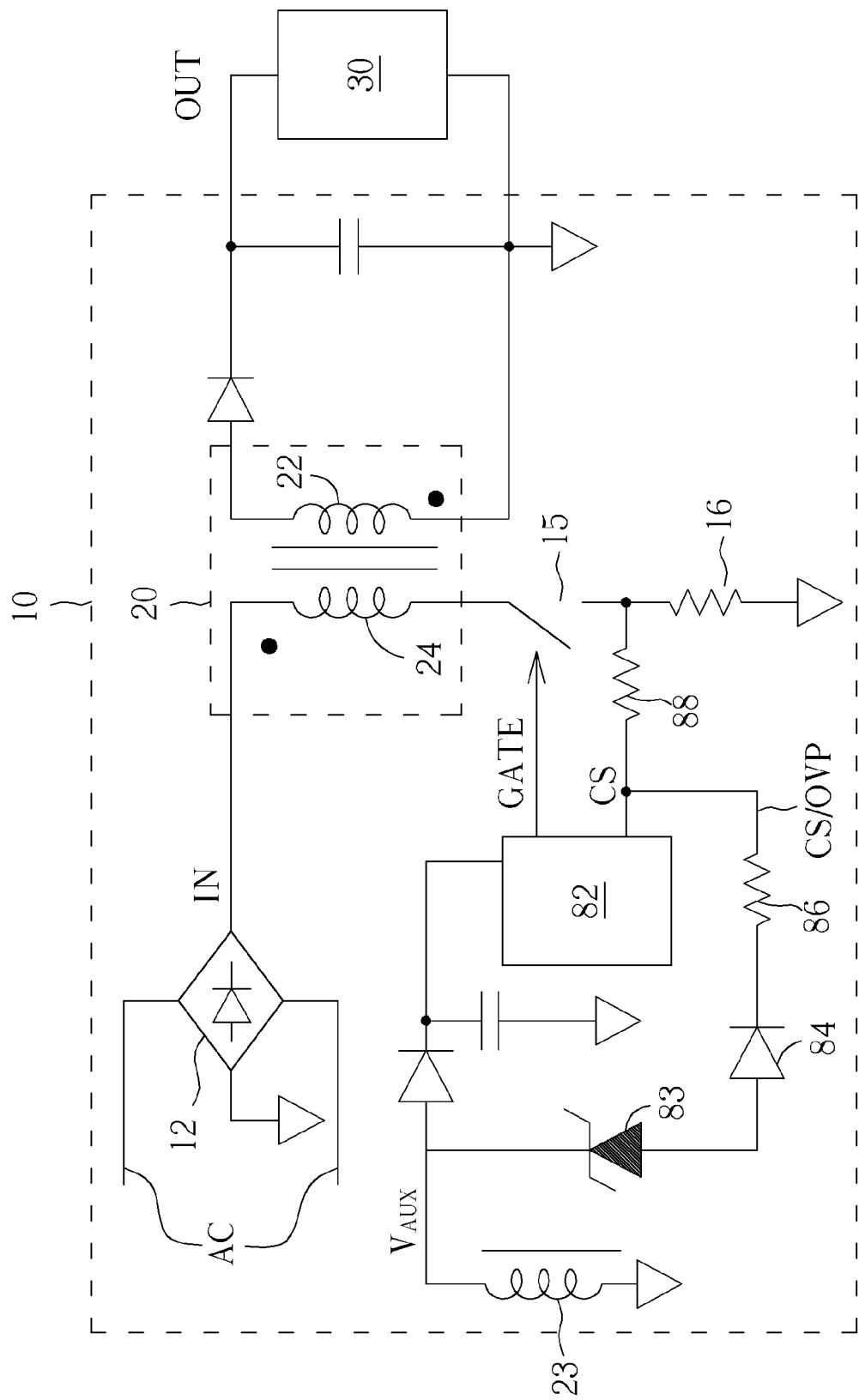
FIG. 4 is a diagram showing a switching mode power supply (SMPS) of the present invention.

FIG. 4 is a diagram showing a switching mode power supply 80 (SMPS 80) of the present invention. Different from the SMPS 10 of FIG. 1, the SMPS 80 comprises a Zener diode 83, a diode 84, resistors 86 and 88, and a controller 82.

The controller 82 can be a single chip integrated circuit with a multi-function terminal CS/OVP. The Zener diode 83, the diode 84, and the resistor 86 are serially coupled between an auxiliary winding 23 and the multi-function terminal CS/OVP. The resistor 88 is coupled between the multi-function terminal CS/OVP and a current sensing resistor 16. The multi-function terminal CS/OVP has at least two functions: (a) current detection, and (b) over voltage protection.

When the controller 82 enables a gate signal $V_{GATE}$ to turn on a power switch 15 via a GATE end, a voltage $V_{CS}$ of the multi-function terminal CS/OVP corresponds to a current through the power switch 15. And, the controller 82 determines when to disable the gate signal $V_{GATE}$ to turn off the power switch 15 according to the voltage $V_{CS}$ of the multi-function terminal CS/OVP.

After the power switch 15 is turned off, a voltage $V_{AUX}$ of the auxiliary winding 23 approximately corresponds to a voltage of a secondary winding as well as an output power voltage $V_{OUT}$. If the voltage $V_{AUX}$ is lower than a predetermined voltage of the Zener diode 83 and the diode 84, the voltage $V_{CS}$ of the multi-function terminal CS/OVP is around 0 Volts. If the voltage $V_{AUX}$ is higher than the predetermined voltage, the voltage $V_{CS}$ of the multi-function terminal CS/OVP is greater than 0 Volts. In order to prevent inaccuracies caused by inductor leakage, the controller 82 compares the voltage $V_{CS}$ with a reference voltage after the power switch 15 is turned off for a period of delay time. If the voltage $V_{CS}$ is higher than the reference voltage, an over voltage signal will be triggered, which indicates that the output power voltage $V_{OUT}$ exceeds a corresponding value of the predetermined voltage of the Zener diode 83 and the diode 84.

Figure 5:
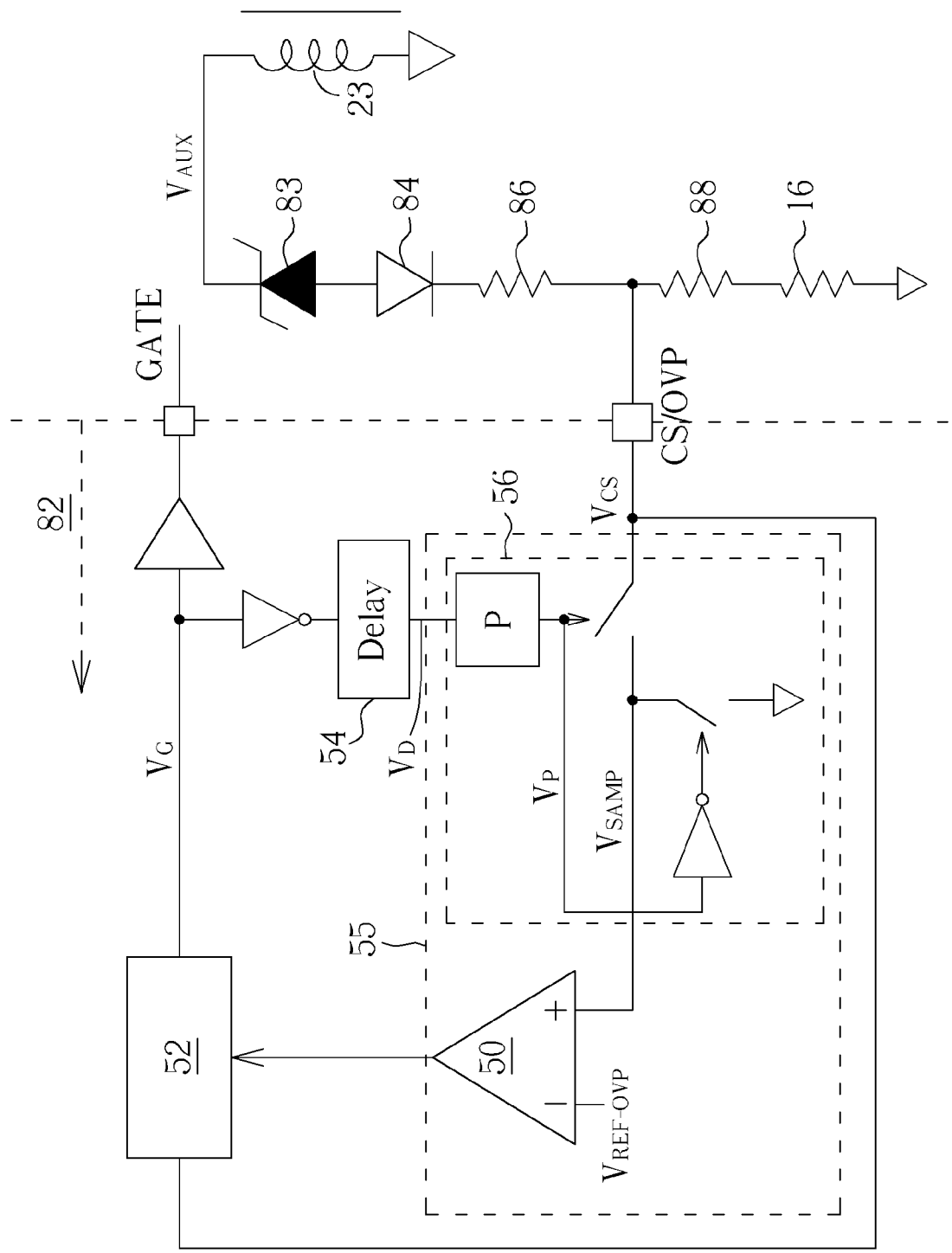
FIG. 5 is a diagram showing part of a controller and components besides the controller.
Figure 6:
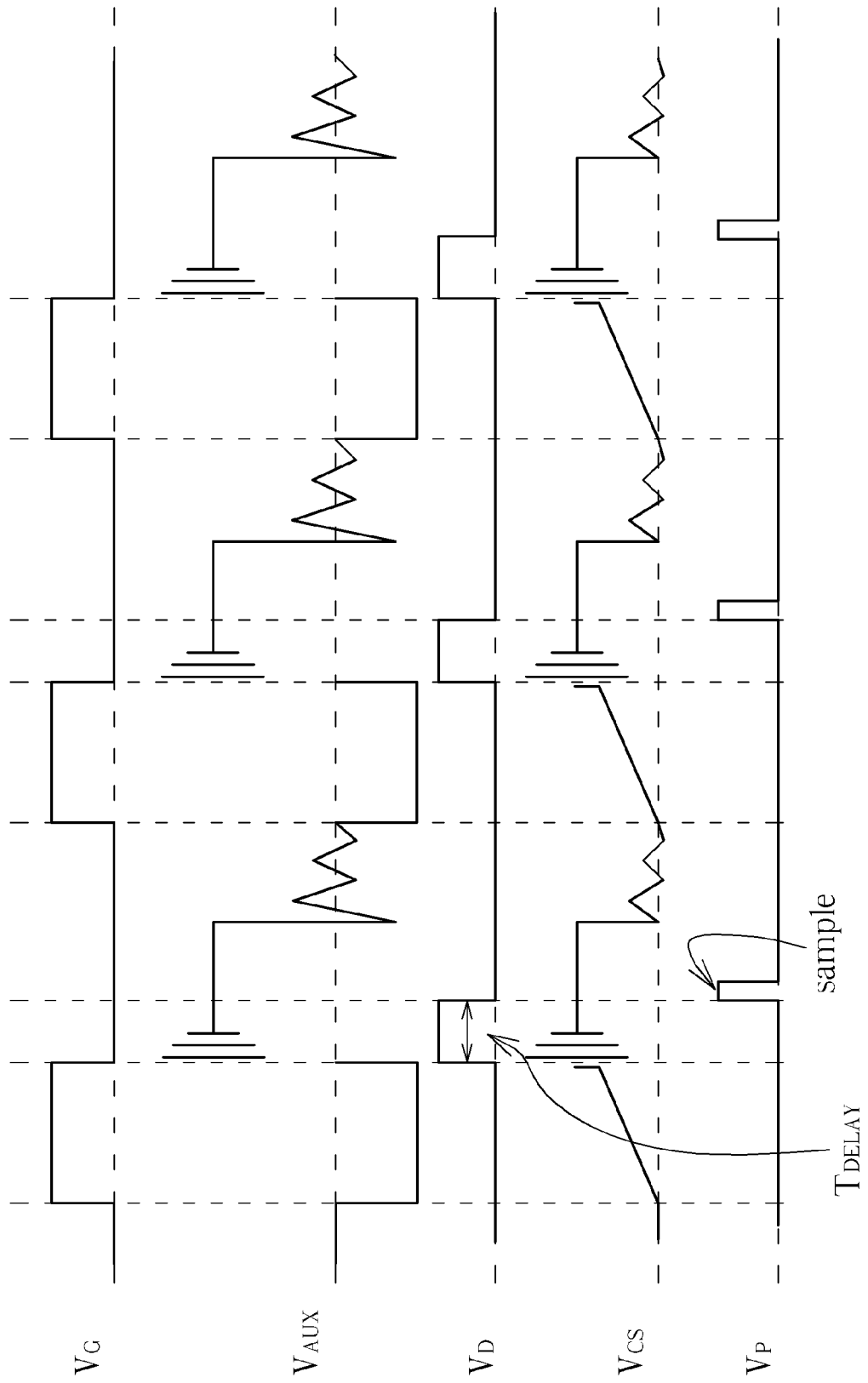
FIG. 6 is a diagram showing waveforms of signals of FIG. 5.

FIG. 5 is a diagram showing part of the controller 82 and components other than the controller 82. FIG. 6 is a diagram showing waveforms of signals of FIG. 5. The controller 82 comprises a delay time generator 54, an over voltage detection circuit 55, and a gate controller 52. The over voltage detection circuit 55 comprises a sampler 56 and a comparator 50.

When a signal $V_G$ is logic "1", the gate signal $V_{GATE}$ is logic "1" as well to turn on the power switch 15. The voltage $V_{AUX}$ of the auxiliary winding 23 is negative. Since the voltage $V_{AUX}$ is blocked by the diode 84, the voltage $V_{CS}$ of the multi-function terminal CS/OVP will not be affected. Therefore, a current through the power switch 15 is increased, such that the voltage $V_{CS}$ increases as shown in FIG. 6.

When the voltage $V_{CS}$ reaches a certain level, the gate controller 52 switches the signal $V_G$ to be logic "0" for turning off the power switch 15. Once the power switch 15 is turned off, the voltage $V_{AUX}$ of the auxiliary winding 23 will oscillate for a period of time and then settle to a positive value proportional to the output power voltage $V_{OUT}$. The delay time generator 54 provides a delay time $T_{DELAY}$ after the power switch 15 is turned off. The delay time $T_{DELAY}$ is for preventing inaccuracies caused by the oscillation of the voltage $V_{AUX}$. After the delay time $T_{DELAY}$, the sampler 56 transmits a short pulse signal $V_P$ for sampling the voltage of the multi-function terminal CS/OVP to generate a sampling signal $V_{SAMP}$. When the short pulse signal $V_P$ is logic "0", the sampling signal $V_{SAMP}$ is coupled to ground to be fixed at 0 Volts. When the short pulse signal $V_P$ is logic "1", the sampling signal $V_{SAMP}$ is equal to the voltage $V_{CS}$. As mentioned above, if the output power voltage $V_{OUT}$ is high, the voltage $V_{AUX}$ of the auxiliary winding 23 is high as well. If the voltage $V_{AUX}$ of the auxiliary winding 23 is high enough to break down the Zener diode 83, the sampling signal $V_{SAMP}$ will be higher than a reference voltage $V_{REF-OVP}$, such that the comparator 50 triggers an over voltage signal $S_{OVP}$. For example, the triggered over voltage signal $S_{OVP}$ can make the gate controller 52 keep the signal $V_G$ at logic "0" through several on-off cycles.

Figure 7:
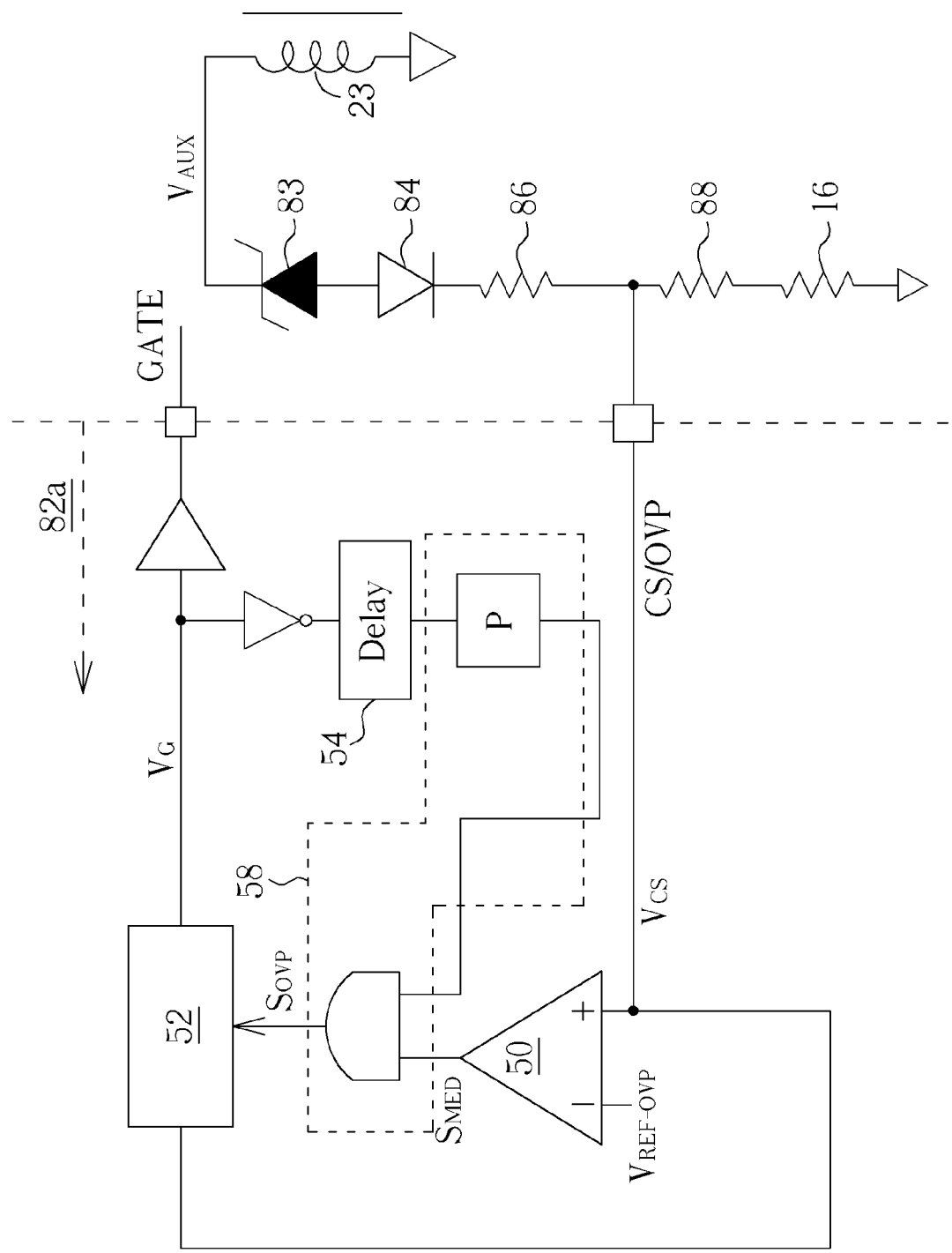
FIG. 7 is another embodiment showing part of a controller and components besides the controller.

FIG. 7 is another embodiment showing part of a controller 82a and components other than the controller 82a. FIG. 6 can also be a diagram showing waveforms of signals of FIG. 7. In FIG. 7, the comparator 50 and a blocking unit 58 can be utilized as an over voltage detection circuit. As shown in FIG. 7, the comparator 50 compares the voltage of the multi-function terminal CS/OVP with the reference voltage $V_{REF-OVP}$ in order to trigger a relay signal $S_{MED}$. Most of the time, the relay signal $S_{MED}$ is blocked by an AND gate of the blocking unit 58. A logic level of the relay signal $S_{MED}$ will be passed as a logic level of the over voltage signal $S_{OVP}$ only when the short pulse signal $V_P$ of the blocking unit 58 is logic "1". Please refer to the illustration of FIG. 5 for description of other operation principles of the embodiments of FIG. 7. Further illustrations are provided herein.

Figure 8:
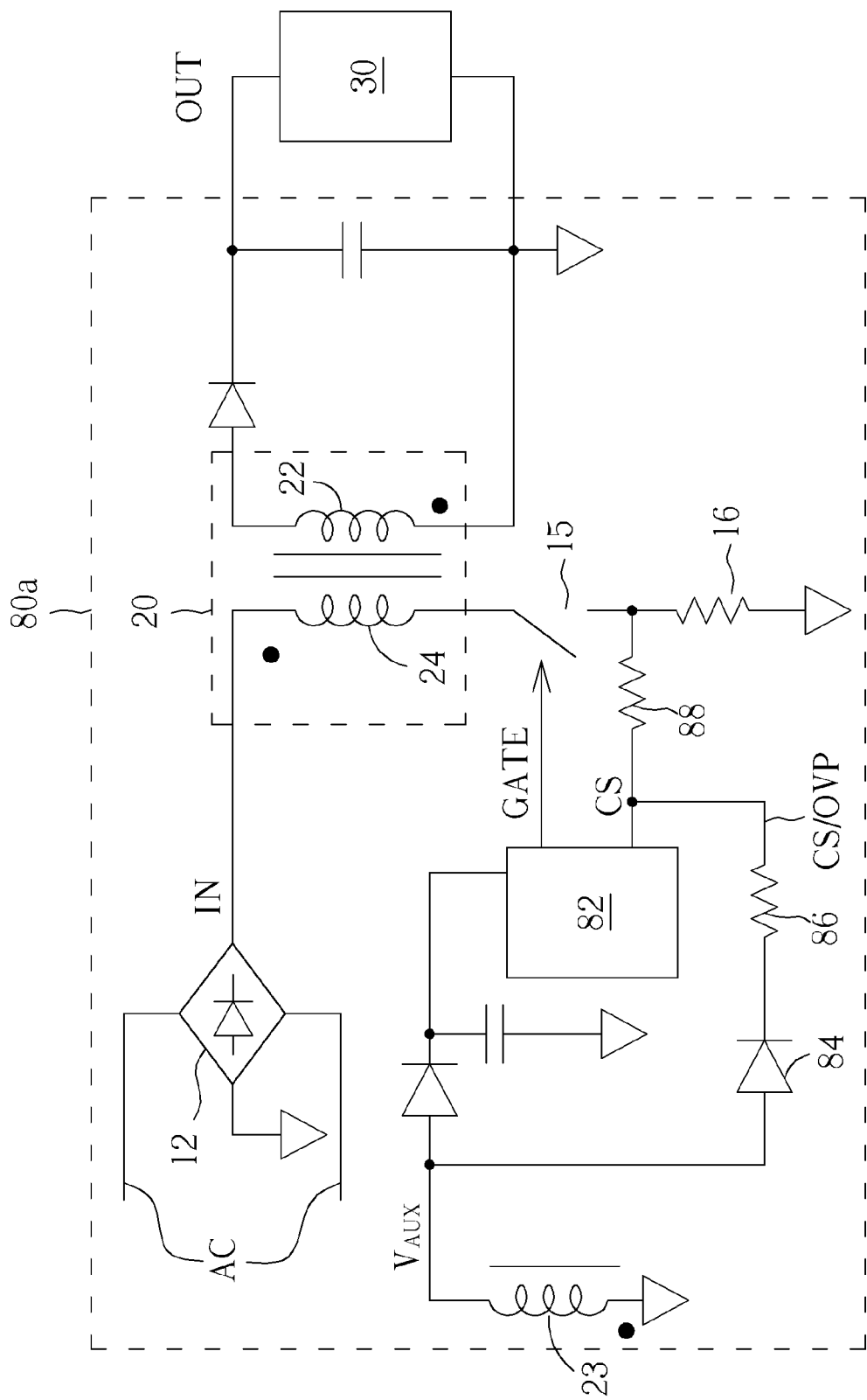
FIG. 8 is a diagram showing another switching mode power supply (SMPS) of the present invention.

FIG. 8 is a diagram showing another switching mode power supply (SMPS) 80a of the present invention. Different from the SMPS 80 of FIG. 4, the SMPS 80a does not comprise the Zener diode 83.

As shown in FIG. 8, after the power switch 15 is turned off, the voltage $V_{CS}$ of the multi-function terminal CS/OVP approximately corresponds to the voltage $V_{AUX}$ of the auxiliary winding 23 as well as the output power voltage $V_{OUT}$. Therefore, the controller 82 compares the voltage $V_{CS}$ with a reference voltage after the power switch 15 is turned off for a period of delay time. If the voltage $V_{CS}$ is higher than the reference voltage, an over voltage signal will be triggered, which indicates that the output power voltage $V_{OUT}$ exceeds a corresponding value of the reference voltage. Internal structure of the controller 82 of FIG. 8 can be implemented according to the circuits of FIG. 5 and FIG. 7, or other equivalent circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for controlling a power switch of a power supply providing an output voltage, the controller comprising:

a multi-function terminal;

a delay time generator for providing a delay time after the power switch is turned off;

an over voltage detection circuit for comparing a voltage of the multi-function terminal with a reference voltage after the delay time in order to trigger an over voltage signal indicating the output voltage is over a predetermined value; and a gate controller for turning off the power switch according to the voltage of the multi-function terminal when the power switch is turned on;

wherein when the power switch is turned on, the voltage of the multi-function terminal corresponds to a current through the power switch;

wherein the over voltage detection circuit comprises:

a comparator for comparing the voltage of the multi-function terminal with the reference voltage to trigger a relay signal; and a blocking unit for blocking the relay signal during the delay time and for taking the relay signal as the over voltage signal in a predetermined time after the delay time.

2. The controller of claim 1, wherein the over voltage detection circuit comprises:

a sampler for sampling the voltage of the multi-function terminal after the delay time to generate a sampling signal; and a comparator for comparing the sampling signal with the reference voltage.

* * * * *